United States Patent Office 3,647,631
Patented Mar. 7, 1972

3,647,631
METHOD FOR PRODUCING TRIOSTIN
Ken Katagiri, Ikeda-shi, Japan, assignor to
Shionogi & Co., Ltd., Osaka, Japan
No Drawing. Filed Feb. 19, 1968, Ser. No. 706,678
Int. Cl. C12d 9/00
U.S. Cl. 195—80                3 Claims

ABSTRACT OF THE DISCLOSURE

A method for producing an antibiotic, triostin, having antibacterial properties, characterized by cultivating *Streptomyces triostinicus*, n. sp. ATCC No. 21,043, in an aqueous nutrient medium under a submerged aerobic condition, recovering from the cultured broth a triostin complex consisting substantially of triostin A, triostin B and triostin C and, if desired, isolating each component of the triostin complex.

---

This invention relates to a novel method for producing an antibiotic, triostin, possessing potent antibacterial properties.

In particular, the invention relates to a method for producing an antibiotic, triostin, characterized by utilization of a new microorganism, *Streptomyces triostinicus*, n. sp.

The antibiotic, triostin, was previously isolated by the present inventor from a cultured broth of Streptomyces S–2–210, and it was also reported that the triostin complex consists substantially of three components, i.e. triostins A, B and C and that triostin C has potent antibacterial properties, especially against gram-positive bacteria (The Journal of Antibiotics, Ser. A, XIV, 335–337 (1961)). Now, it has newly been discovered that a microorganism belonging to a new species, *Streptomyces triostinicus*, is capable of producing the said antibiotics when cultivated in an aqueous nutrient medium under a submerged aerobic condition in a higher yield than that achieved with the known microorganism, Streptomyces S–2–210. The present invention has been accomplished on the basis of this discovery.

Accordingly, the principal object of the invention is to provide a new method for the production of the antibiotics, triostins. Another object of the invention is to provide a new microorganism being capable of producing useful antibiotics in an excellent yield. A further object of the invention is to provide an effective improvement in the production of the antibiotics, triostins. These and other objects of the present invention will become apparent to those conversant with the art to which the present invention is concerned from the following descriptions.

The microorganism employed in the method of the present invention was isolated from a soil sample collected in Japan, the typical strain of which was deposited with the American Type Culture Collection under an accession number ATCC No. 21,043. This organism shows the following micro-biological characteristics.

lowing microbiological characteristics.

MORPHOLOGICAL CHARACTERISTICS

The morphology of the culture was studied on glucose-asparagin agar. The colony is covered with velvety and gray to grayish white aerial mycelium. The microscopic observation shows that the aerial mycelium is simply branched, waved or slightly curved, and occasionally forms spirals or loops. Spores are cylindrical with smooth surface, 0.7 to 1.0 by 5 microns.

CULTURAL CHARACTERISTICS
[For 14 days at 27° C.]

| Medium | Growth | Vegetative mycelium | Aerial mycelium | Soluble pigment | Note |
|---|---|---|---|---|---|
| Czapek agar | Poor | White to gray | None | None | |
| Glucose, Czapek agar | Good | Brownish gray | do | do | |
| Asparagin, glucose agar | do | White to grayish white | Abundant, grayish white | do | |
| Ca-malate agar | do | Brownish gray | Poor, white | do | |
| Starch agar | Poor | Grayish white | Poor, grayish white | do | Hydrolysis of starch weakly positive. |
| Bouillon agar | Good | Brownish gray | None | do | Chromogenicity negative. |
| Glucose bouillon agar | Good, wrinkled | Pale yellowish brown | do | do | Do. |
| Peptone, glucose agar | Good | Yellowish brown | Poor, white | do | |
| Tyrosine agar | Poor | Colorless | do | do | Tyrosinase negative. |
| Egg-yolk | Good | Yellow | None | do | |
| Potato plug | do | Brownish white | do | do | Plaque color colorless. |
| Cellulose medium | No growth | | | | |
| Loeffler | do | | | | |
| Litmas milk | Good, pericle | None | None | | Coagulation and peptonization, positive pH turned to alkaline. |
| Gelatin stab | Poor | Grayish white | Poor, grayish white | do | Liquefaction, positive. |

PHYSIOLOGICAL CHARACTERISTICS (1) Optimum temperature: 28° C.
(2) Growth temperature: 25–37° C., no growth at 45° C.
(3) Liquefaction of gelatin: positive
(4) Hydrolysis of starch: positive
(5) Tyrosinase reaction: negative
(6) Peptonization of milk: positive
(7) Coagulation of milk: positive
(8) Reduction of nitrate: negative
(9) Utilization of cellulose: negative
(10) Chromogenicity: negative
(11) Production of melanoid pigment: negative

UTILIZATION OF CARBON SOURCE

| Carbon source: | Result |
|---|---|
| Glucose | ++ |
| Mannose | ++ |
| D-fructose | ++ |
| Inositol | ++ |
| L-arabinose | + |
| Lactose | + |
| Rhamnose | + |
| Raffinose | + |
| Salicin | + |
| D-mannitol | + |
| L-xylose | ± |
| Sucrose | − |

Note: ++, good growth and positive utilization; +, moderate growth and positive utilization; ± faint growth and probably no-utilization; —, no growth and no-utilization.

Among the many species of Streptomyces described in Bergey's "Manual Determinative Bacteriology," Waksman and Lechevalier's "Actinomyces and their Antibiotics" and other literatures, *Streptomyces cacaoi* (Waksman), *Streptomyces acidophilus* (Waksman), *Streptomyces gougeroti* (Waksman), *Streptomyces pseudogriseolus* (Okami), *Streptomyces griseoplanus* (Backus) and *Streptomyces wedomosensis* (Millard) appear to be similar to the microorganism in chromogenicity and productions of melanoid pigment and soluble pigment. However, the strain can be differentiated from these known species by characteristics listed in the following table.

The pH tends to remain rather constant during the fermentation but, if variations are encountered, a buffering agent such as calcium carbonate may be added to the medium. Occasionally, the pH moves to the alkaline side during the fermentation and, in such case, an acidic substance such as acetic acid and ammonium sulfate may be added. Generally speaking, the pH may be kept between 5.9 and 8.2, preferably around 7. If excessive foaming is encountered during the fermentation anti-foaming agents such as vegetable oils, lard oil and polypropyleneglycol may be added to the fermentation medium prior to or in the course of the fermentation. The maximum yields of the antibiotic triostin can be obtained within about 72 to about 170 hours of fermentation under optimum conditions of temperature and aeration.

After growth of the microorganism, the mycelium may be removed from the fermentation broth by using standard equipment, such as filter-presses and centrifuges, and than the antibiotic triostin may be recovered from the

COMPARISON WITH EVERY KNOWN SPECIES

| | Streptomyces triostinicus ATCC 21043 | Streptomyces cacaoi | Streptomyces acidophilus | Streptomyces gougeroti | Streptomyces pseudogriseolus | Streptomyces griseoplanus | Streptomyces wedomosensis |
|---|---|---|---|---|---|---|---|
| Aerial mycelium | Straight (a few loops or spirals). | Spirals | Spirals | Straight (short) | Spirals | | Straight. |
| Sucrose nitrate | No-growth | | | No-growth | | G, good; A, white to gray; S, colorless. | G, flat; A, white to gray; S, colorless. |
| Glucose asparagin | G, good; A, grayish white; S, none. | G, poor; A, yellow; S, none. | G, colorless; A, gray, S, colorless. | G, colorless; A, white; S, colorless. | | G, gray to pinkish; A, none; colorless. | |
| Nutrient agar | G, brownish gray; A, none; S, none. | G, brown; A, ivory; S, none. | No-growth | G, green; A, white; S, yellow. | G, colorless; A, white; S, none. | | |
| Gelatin | G, poor; A, none; S, none; L, positive. | A, none; S, none; L, positive. | S, colorless; L, positive. | S, cream; L, positive. | G, yellow brown; A, white to gray; L, positive. | | A, none; L, positive. |
| Milk | G, colorless; P, positive; C, positive. | | No-growth | G, white; L, positive; C, positive. | G, orange; P, positive; C, positive. | No-growth | C, green; P, positive; C, positive. |
| Potato | G, brownish gray; A, none; PC, colorless. | G, brownish gray; A, gray. | G, colorless; PC, colorless. | G, colorless; A, white; PC, colorless. | G, colorless; A, white; PC, colorless. | G, light brown; A, white to gray; PC, brown. | G, grayish; A, white; PC, brown. |

NOTE.—G=growth; A=aerial mycelium; S=soluble pigment; L=liquefaction of gelatin; P=peptionization of milk; C=coagulation of milk; PC=plaque color.

As a result of the above observations, the microorganism of the present invention has been designated a new species and named *Streptomyces triostinicus*, n. sp.

It is to be understood that for the production of triostin the present invention is not limited to the use of *Streptomyces triostinicus*, n. sp. It is especially desired and intended to include the use of triostin-producing mutants or variants produced from the described organism by various means, such as X-rays, ultra-violet radiation and nitrogen mustard.

According to the present invention, the antibiotic, triostin, is produced during cultivation of the microorganism, *Streptomyces triostinicus*, n. sp., in an aqueous nutrient medium at a temperature of about 25 to about 37° C., preferably 27 to 29° C., under aerobic conditions. The composition of this nutrient medium may be varied over a very wide range. Essentially what is required is a carbon source, a nitrogen source and trace inorganic elements. Examples of suitable carbon sources are starch, lactose, maltose, frustose, inositol and glycerol. Suitable sources of nitrogen for the fermentation process include meat extracts, peptone, corn steep liquor, soybean meal and yeast extracts. Examples of suitable sources of inorganic elements are mineral salts, such as sodium chloride, potassium chloride, calcium carbonate and phosphates.

The nutrient medium may or may not be adjusted to about pH 7 prior to inoculation of the microorganism.

filtrate by a solvent extraction procedure. As the antibiotic triostin is retained by the mycelium in appreciable quantities, a solvent extraction procedure is preferably used to recover the antibiotic from the mycelium or the whole broth without the removal of the mycelium. Suitable extraction solvents include methanol, ethanol, dioxane, acetone, chloroform, tetrachloroethane and ethyl acetate. For the extraction of the antibiotic from larger volume of broth, however, an adsorption procedure is superior to an ordinary solvent extraction procedure. For instance, the whole broth may be filtered after the addition of an adsorbent, such as Hyflo Super-Cel (diatomaceous earth), and the resulting cake of adsorbent and mycelium may be eluted with a suitable organic solvent, such as chloroform, dioxane, ethanol and methanol, to extract the antibiotic. The extract may be concentrated and a suitable organic solvent such as petroleum ether, petroleum benzin and ligroin added to precipitate the crude active component, i.e. triostin complex.

The thus obtained triostin complex may be further purified, if desired, by suitable operations, such as recrystallization, chromatography and the like, whereby the complex can be divided into its essential components, triostin A, triostin B and triostin C. Examples of suitable recrystallization solvent are methanol, ethanol, acetone, ethyl acetate, chloroform and mixture thereof. The preferred chromatographic adsorbents are silica-gel, silicic acid and the like.

Triostins A, B and C are known substances, and their chemical structures have also been proposed (The Journal of Antibiotics, Ser. A, XIX, 128 (1966)). The main components are triostin A and triostin C, of which physical and chemical properties are as follows:

Triostin A: colorless needles, when recrystallized from chloroform-methanol; M.P. 245–248° C. (decomp.); $[\alpha]_D^{23.5} -157 \pm 2°$ (c.=0.970 in chloroform);

$IR\nu_{max}^{CHCl_3}$ 3320, 2960, 1746, 1672, 1644, 1573, 1505, 1493, 1408, 1368, 1325, 1290, 1273, 1167, 1128, 1090, 1082, 1065, 1053, 1000, 980, 962, 939, 911, 834 cm.$^{-1}$;

$UV\lambda_{max}^{MeOH}$ 243 m$\mu$ (log $\epsilon$: 4.85)

*Analysis.*—Calcd. for $C_{50}H_{62}O_{12}N_{12}S_2$ (percent): C, 55.21; H, 5.71; N, 15.47; S, 5.89. M.W., 1086. Found (percent): C, 55.25; H, 5.71; N, 15.47; S, 5.89. N.W., 1035 (osmometry, chloroform).

Triostin C: colorless needles, when recrystallized from methanol, ethyl acetate, chloroform and mixture thereof, and colorless plates, when recrystallized from acetone-containing solvent; M.P. 210–214° C.; $[\alpha]_D^{24} -143.9 \pm 2°$ (c.=1.121 in chloroform);

$IR\nu_{max}^{Nujol}$ 3420, 1745, 1690, 1650, 1578, 1515, 1495, 1410, 1245, 1205, 1180, 1131, 1102, 1059, 1038, 1014, 982, 932, 910, 829, 776, 775 cm.$^{-1}$;

$UV\lambda_{max}^{MeOH}$ 243 m$\mu$(log $\epsilon$: 4.87), 315–326 m$\mu$ (log $\epsilon$: 4.13).

*Analysis.*—Calcd. for $C_{54}H_{70}O_{12}N_{12}S_2$ (percent): C, 56.74; H, 6.13; N, 14.71; S, 5.60. Found (percent): C, 56.64; H, 6.23; N, 14.32; S, 5.21.

Triostin C shows inhibitory activity against a variety of microorganisms, especially against gram-positive bacteria in wide range and *Mycobacterium tuberculosis* var. *hominis* H37Rv, and the following table illustrates the anti-bacterial spectrum of triostin C.

MINIMUM INHIBITORY CONCENTRATION (MIC)

| Test organisms | MIC (mcg./ml.) | Medium |
| --- | --- | --- |
| *Staphylococcus aureus*: | | |
| 209 P | 0.10 | Nutrient agar. |
| Terashima | 0.10 | Do. |
| *Bacillus subtilis* PCI 219 | 0.05 | Do. |
| *Bacillus anthracis* | 0.1 | Do. |
| *Bacillus agri* | 0.05 | Do. |
| *Sarcina lutea* | 0.05 | Do. |
| *Diplococcus pneumoniae*: | | |
| Type I | 0.02 | Blood agar. |
| Type II | 0.02 | Do. |
| Type III | 0.02 | Do. |
| *Corynebacterium diphtheriae*: | | |
| Tront | 0.01 | Do. |
| S | 0.01 | Do. |
| *Streptococcus hemolyticus*: | | |
| D | 0.1 | Do. |
| HA | 0.1 | Do. |
| *Shigella dysenteriae* | >100.0 | Nutrient agar. |
| *Shigella sonnei* | >100.0 | Do. |
| *Salmonella typhosa* | >100.0 | Do. |
| *Salmonella paratyphi* A | >100.0 | Do. |
| *Escherichia coli* | >100.0 | Do. |
| *Pseudomonas aeruginosa* | >100.0 | Do. |
| *Klebsiella pneumoniae* | >100.0 | Do. |
| *Mycobacterium tuberculosis* var. *hominis* H37Rv | 0.2 | Kirchner's medium. |

The antibacterial spectrum of triostin complex is quite similar to that of triostin C. The median lethal dose value (LD$_{50}$ value) was determined in mice intraperitoneally to be 100 mg./kg.

The antibiotic triostin complex and its individual components are useful as agents for inhibiting the growth of gram-positive pathogenic microorganisms and mycobacteria. It is useful for sterilizing equipment, for example surgical instruments. It is also useful in obtaining pure cultures of single organisms where a susceptible organism may be separated from a resistant one.

The following example is given solely for the purpose of illustration and is not to be construed as limitations of this invention, many variations of which are possible.

EXAMPLE

*Streptomyces triostinicus* ATCC No. 21,043 is inoculated to a nutrient medium composed of 5 g. of meat extract, 5 g. of peptone, 20 g. of glucose, 0.5 g. of sodium chloride, 0.35 g. of calcium carbonate and 1 l. of distilled water, and incubated at 28° C. for 2 days. The thus obtained cultured broth is used as inoculum.

A nutrient medium composed of 20 g. of sodium nitrate, 10 g. of potassium hydrogen phosphate, 2.5 g. of calcium chloride, 20 g. of D-maltose and 10 l. of distilled water is sterilized and inoculated with the inoculum prepared above. The cultivation is performed at 28° C. for 3 to 7 days under an aerobic condition, until the concentration of triostin amounts to about 80 $\mu$g./ml. (determined by spectrophotometer).

The cultured broth is filtered and the filtrate is extracted with 5 l. of ethyl acetate. On the other hand, the collected mycelium is 2 to 3 times extracted with a total of 4 l. of 70% aqueous acetone and the aqueous acetone solution is evaporated under reduced pressure. The aqueous residue is adjusted to an approximately neutral pH and extracted 2 to 3 times with a total of 4 l. of ethyl acetate. The ethyl acetate extracts are combined, dried over anhydrous sodium sulfate and evaporated under reduced pressure. The residue is dissolved in chloroform or ethyl acetate and crude triostin complex is precipitated by addition of petroleum ether. Yield, 1.3 g.

The thus obtained triostin complex is dissolved in chloroform and chromatographed on 350 g. of silicic acid and eluted with chloroform-methanol (100:1) to give 220 mg. of triostin C, a trace of triostin B and 400 mg. of triostin A.

What is claimed is:

1. A process for producing the antibiotic triostin which comprises cultivating a strain of *Streptomyces triostinicus* n. sp., ATCC No. 21,043, in an aqueous nutrient medium at a pH from about 5.9 to 8.2 and at a temperature from about 25° C. to 37° C. under aerobic conditions for about 3 to 7 days, and recovering the accumulated antibiotic from the culture medium.

2. A process according to claim 1 wherein the pH is about 7.

3. A process according to claim 1, wherein the temperature is about 27° C. to 29° C.

References Cited

Chemical Abstracts, vol. 56, 1962, p. 7803g.
Journal of Antibiotics, vol. 14, November 1961, pp. 324–329.

JOSEPH M. GOLIAN, Primary Examiner